US012664582B2

(12) United States Patent
McNab et al.

(10) Patent No.: US 12,664,582 B2
(45) Date of Patent: Jun. 23, 2026

(54) COMPUTING APPARATUS, METHOD AND PROGRAM FOR DATA RECONCILIATION

(71) Applicant: Xero Limited, Te Aro (NZ)

(72) Inventors: Rodger McNab, Te Aro (NZ); Juan Carlos Rada-Vilela, Te Aro (NZ); Stanley Roache, Te Aro (NZ)

( * ) Notice: Subject to any disclaimer, the term of this patent is extended or adjusted under 35 U.S.C. 154(b) by 57 days.

(21) Appl. No.: 18/847,099

(22) PCT Filed: Feb. 17, 2023

(86) PCT No.: PCT/NZ2023/050016
§ 371 (c)(1),
(2) Date: Sep. 13, 2024

(87) PCT Pub. No.: WO2023/177308
PCT Pub. Date: Sep. 21, 2023

(65) Prior Publication Data
US 2025/0363552 A1      Nov. 27, 2025

(30) Foreign Application Priority Data
Mar. 15, 2022    (AU) ................................ 2022900632

(51) Int. Cl.
*G06Q 40/02*          (2023.01)
(52) U.S. Cl.
CPC ......... *G06Q 40/022* (2025.08); *G06Q 40/023* (2025.08)

(58) Field of Classification Search
CPC .......................... G06Q 40/022; G06Q 40/023
See application file for complete search history.

(56) References Cited

U.S. PATENT DOCUMENTS

| | | | |
|---|---|---|---|
| 5,093,787 A | | 3/1992 | Simmons |
| 7,240,028 B1 | | 7/2007 | Rugge |
| 2005/0044015 A1 | | 2/2005 | Bracken et al. |
| 2009/0119515 A1 | * | 5/2009 | Nicolson ................. G06F 21/14 |
| | | | 713/190 |
| 2010/0023511 A1 | * | 1/2010 | Borodziewicz ....... G06F 16/334 |
| | | | 707/E17.014 |
| 2010/0332360 A1 | | 12/2010 | Nowotny |
| 2013/0085902 A1 | | 4/2013 | Chew |
| 2015/0324930 A1 | | 11/2015 | Abernethy |
| 2019/0012733 A1 | | 1/2019 | Gorman et al. |
| 2021/0118047 A1 | * | 4/2021 | Gorman ................. G06Q 40/02 |
| 2023/0080396 A1 | * | 3/2023 | Rizk .................. G06Q 30/0631 |
| | | | 705/26.7 |

* cited by examiner

*Primary Examiner* — Allen C Chein
(74) *Attorney, Agent, or Firm* — Young Basile Hanlon & MacFarlane, P.C.

(57) ABSTRACT
A mechanism for reconciling unreconciled bank statement lines with corresponding accounting book entries in an online bookkeeping service. A machine-configurable similarity measurement model is applied to quantify similarity of an unreconciled bank statement line to each of a set of historical bank statement line reconciliations for a specific user, to identify a most similar line reconciliation, and upon satisfaction of a threshold, to automatically reconcile the unreconciled bank statement line with extracted accounting book entry details from the identified reconciliation.

15 Claims, 5 Drawing Sheets

COMPUTING APPARATUS, METHOD AND PROGRAM FOR DATA RECONCILIATION

CROSS-REFERENCE TO RELATED APPLICATION(S)

This application is a national stage 371 application of PCT/NZ2023/050016, filed on Feb. 17, 2023, which claims priority to and the benefit of Australian Patent Application Serial No. 2022900632, filed Mar. 15, 2022, the entire disclosures of which are hereby incorporated by reference.

TECHNICAL FIELD

The present disclosure is in the field of data handling and extract, transfer, load tasks. Specifically, the present disclosure lies in the field of data reconciliation tasks, in which data that are unstructured or structured according to a native model are imported into, or mapped to, a system with a different model.

BACKGROUND

Data reconciliation may be required in data import or data mapping tasks. In the context of accounting systems, a specific form of data reconciliation is bank reconciliation. Bank reconciliation is a process to confirm that all the transactions appearing in a bank account statement are recorded in corresponding business accounting records (i.e. general ledger). Bank statement lines are reconciled with ledger entries in an accounting system. Reconciliation in this sense can be considered a data mapping task, in which a data entry in a first format, the bank statement line, is mapped to (or otherwise associated with) accounting book details. The accounting book/ledger comprises plural accounting book entries, each of which is composed of various accounting book details. Accounting book entries may also be referred to as ledger entries or transaction entries. Accounting book details are categorized in accordance with a modelling paradigm of the accounting system, wherein such categorizations form a logical basis for tasks such as report preparation and account summaries.

SUMMARY

Embodiments include a computing apparatus comprising processor hardware, memory hardware, and network interface hardware, the memory hardware storing processing instructions which, when executed by the processor hardware, cause the computing apparatus to provide a reconciliation engine for reconciling unreconciled bank statement lines with corresponding accounting book entries in an online bookkeeping service of an accounting system having one or more users, the unreconciled bank statement lines being imported into the accounting system and representing a payment in which the user is a participant; the reconciliation engine comprising an historical reconciliation tool, being operable, for each of one or more of the unreconciled bank statement lines, to use a similarity measurement model to quantify similarity of the unreconciled bank statement line to each of a set of historical bank statement line reconciliations for the same user, to identify a most similar historical bank statement line reconciliation to the unreconciled bank statement line, to extract one or more accounting book entry details from the said most similar historical bank statement line reconciliation, and upon satisfaction of a threshold minimum similarity, to automatically or semi-automatically reconcile the unreconciled bank statement line with the extracted one or more accounting book entry details; the computing apparatus being operable to execute a machine learning algorithm to configure the similarity measurement model, the similarity measurement model comprising one or more input vector components, with respective configurable weights, and a configurable bias.

Optionally, the reconciliation is semi-automatic and comprises suggesting to a user, via a graphical user interface of the reconciliation tool, the extracted one or more accounting book entry details as accounting book entry details for the unreconciled bank statement line, and reconciling the unreconciled bank statement lines with the extracted one or more accounting book entry details in dependence upon a positive indication from the user.

Optionally, configuring the similarity measurement model is executed with a training set comprising a plurality of pairs of historical bank statement line reconciliations for the user, and for each pair an input vector is composed of a value of each of the one or more input vector components for the pair, and a desired output vector is a binary indicator representing whether or not a threshold commonality between the accounting book entry details of the respective reconciliations is satisfied.

Optionally, the set of historical bank statement line reconciliations comprises reconciliations of bank statement lines dated within a threshold maximum number of days preceding a present date.

Optionally, the one or more input vector components includes input vector components based on similarity of one or a combination of values of payee text, reference text, and notes text, of the relevant bank statement lines and corresponding reconciled accounting book entry details.

Optionally, the unreconciled bank statement line and the historical bank statement line reconciliations comprise values of a combination of bank statement line elements from among:

from the bank statement line:
unique identifier;
timestamp of the represented payment;
payee of the represented payment;
reference text of the represented payment;
notes relating to the represented payment;
amount of currency transferred by the represented payment.

Optionally, the historical bank statement line reconciliations include values of accounting book entry detail elements from among:

number of items in the represented payment;
a timestamp for a timing of reconciliation;
a code indicating a type or descriptor of the represented payment;
a text concatenation of the payee, reference text, and notes, of the represented payment;
a contact identifier for a representation of the payee within the accounting system;
a unique identifier of an account into which the represented payment is received.

Optionally, the machine learning algorithm configures the similarity measurement model to solve a binary classification problem formulated as:

given the unreconciled bank statement line and the set of historical bank statement line reconciliations for the same user, which of the set of historical bank statement line reconciliations is most similar to the unreconciled bank statement line such that the accounting book entry details of the said most similar historical bank statement line reconciliation can be inherited automatically or semi-automatically by the unreconciled bank statement line.

Optionally, the machine learning algorithm configures the historical reconciliation tool to adapt the threshold minimum similarity to reduce a number of incorrect suggestions exceeding the threshold minimum similarity and to reduce a number of correct suggestions not exceeding the threshold minimum similarity.

Optionally, the machine learning algorithm is a logistic regression machine learning algorithm operable to configure the weights of each of the one or more input vector components.

Optionally, the one or more input vector components comprises a single input vector component, the single input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of the same bank statement line elements in the same order.

Optionally, the one or more input vector components comprises two input vector components: a first input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of the same bank statement line elements in the same order and from which words containing numeric characters are excluded; a second input vector component being normalized Levenshtein distance between a second unreconciled text string, representing the unreconciled bank statement line, and a second reconciled text string representing the historical bank statement line reconciliation, the second unreconciled text string and the second reconciled text string each being composed of a concatenation of text strings being values of the same bank statement line elements in the same order and from which words not containing numeric characters are excluded.

Optionally, the one or more input vector components comprises two, three, four, five, six, or seven input vector components from among:

a first input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of the same bank statement line elements in the same order and from which words containing numeric characters are excluded, and optionally from which calendar month names and abbreviations thereof are excluded;

a second input vector component being normalized Levenshtein distance between a second unreconciled text string, representing the unreconciled bank statement line, and a second reconciled text string representing the historical bank statement line reconciliation, the second unreconciled text string and the second reconciled text string each being composed of a concatenation of text strings being values of the same bank statement line elements in the same order and from which words not containing numeric characters are excluded;

a third input vector component being a proportion of words from a payee name text string instantiating a payee name element in the accounting book entry details of the historical bank statement line reconciliation that appear in the first unreconciled text string representing the unreconciled bank statement line, as a proportion of the number of words in the payee name text string;

a fourth input vector component being a binary value representing whether or not line elements representing respective financial values of the unreconciled bank statement line and the historical bank statement line reconciliation match one another or not;

a fifth input vector component being a binary value representing whether a fifth unreconciled text string, representing the unreconciled bank statement line, and a fifth reconciled text string, representing the historical bank statement line reconciliation, are equal to one another, wherein the fifth reconciled text string and the fifth unreconciled text string are each composed of a concatenation of all words containing numbers from the unreconciled bank statement line and from the bank statement line of the historical bank statement line reconciliation, wherein the binary value is nil in case of there being no words containing numbers or no match;

a sixth input vector component being a binary value representing whether or not a number of words from a text string instantiating a payee name element in the unreconciled bank statement line that appear in the historical bank statement line reconciliation is greater than a number of words from the said text string that appear in the unreconciled bank statement line;

a seventh input vector component being a binary value representing whether or not the historical bank statement line reconciliation has a single line item or not.

Embodiments include a computer-implemented method comprising providing a reconciliation engine for reconciling unreconciled bank statement lines with corresponding accounting book entries in an online bookkeeping service of an accounting system having one or more users, the unreconciled bank statement lines being imported into the accounting system and representing a payment in which the user is a participant; the method including an historical reconciliation process, for each of one or more of the unreconciled bank statement lines, comprising: using a similarity measurement model to quantify similarity of the unreconciled bank statement line to each of a set of historical bank statement line reconciliations for the same user, to identify a most similar historical bank statement line reconciliation to the unreconciled bank statement line, to extract one or more accounting book entry details from the said most similar historical bank statement line reconciliation, and upon satisfaction of a threshold minimum similarity, to automatically or semi-automatically reconcile the unreconciled bank statement line with the extracted one or more accounting book entry details; the method further comprising executing a machine learning algorithm to configure the similarity measurement model, the similarity measurement model comprising one or more input vector components, with respective configurable weights, and a configurable bias.

Embodiments include a computer program which, when executed by a computing apparatus having processor hardware and memory hardware, causes the computing apparatus to perform a method comprising providing a reconciliation engine for reconciling unreconciled bank statement lines with corresponding accounting book entries in an online bookkeeping service of an accounting system having one or more users, the unreconciled bank statement lines being imported into the accounting system and representing a payment in which the user is a participant; the method including an historical reconciliation process, for each of one or more of the unreconciled bank statement lines, comprising: using a similarity measurement model to quantify similarity of the unreconciled bank statement line to each of a set of historical bank statement line reconciliations for the same user, to identify a most similar historical bank statement line reconciliation to the unreconciled bank statement line, to extract one or more accounting book entry details from the said most similar historical bank statement line reconciliation, and upon satisfaction of a threshold minimum similarity, to automatically or semi-automatically reconcile the unreconciled bank statement line with the extracted one or more accounting book entry details; the method further comprising executing a machine learning algorithm to configure the similarity measurement model, the similarity measurement model comprising one or more input vector components, with respective configurable weights, and a configurable bias.

Advantageously, embodiments provide a machine learning approach to offer automated or semi-automated reconciliations between bank statement lines and accounting book/ledger entries. Specifically, embodiments exploit the reconciliation history of the user to offer suggestions of details or elements to include in a new accounting ledger entry with which to reconcile an unreconciled bank statement line. Such details or elements include contacts and accounts. The underlying hypothesis is, at any given organisation (i.e. user) with a reconciliation history, it is likely for an unreconciled (new) bank statement line to have similarly reconciled bank statement lines in the past, which the online bookkeeping tool may find, based on text similarity (and other characteristics), and suggest to a user via the GUI of the online bookkeeping service to create a new transaction ledger entry inheriting details such as the contacts and accounts against which the most similar reconciled bank statement line in the past was reconciled. The past in this context is a fixed time period from which historical reconciliations for the user are retrieved and compared with the unreconciled bank statement line). Embodiments use a machine learning approach to compute the similarity between the unreconciled bank statement line (target) and the historical bank statement line reconciliations (candidates).

LIST OF FIGURES

Embodiments are described in detail with reference to the accompanying drawings, in which.

DETAILED DESCRIPTION

Figure 1:
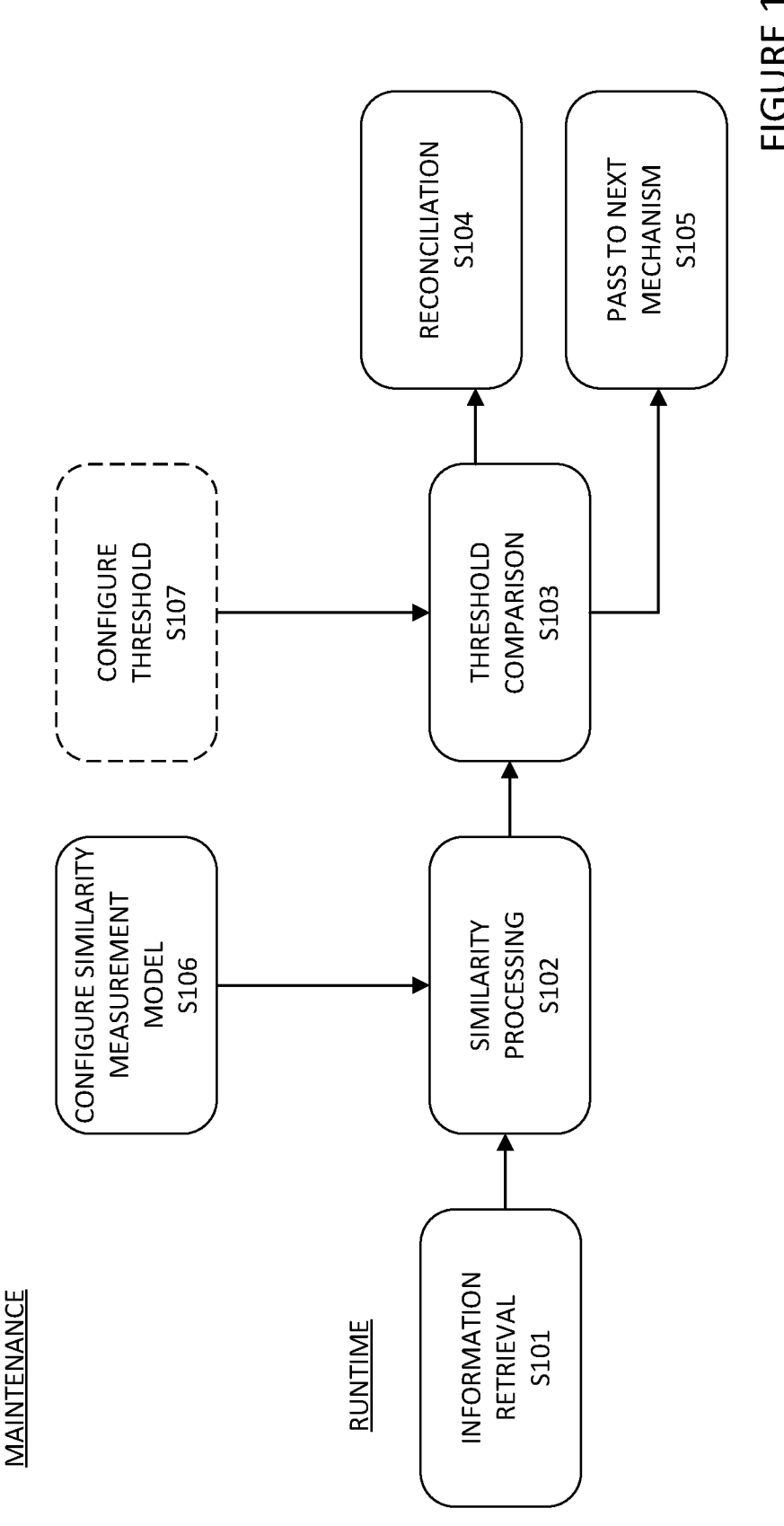
FIG. 1 illustrates maintenance and runtime processing according to an embodiment.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

A computer-implemented method, program, non-transitory computer-readable medium, and apparatus to cause a computing apparatus to provide a reconciliation engine for reconciling unreconciled bank statement lines with corresponding accounting book entries in an online bookkeeping service. A similarity measurement model is applied to quantify similarity of the unreconciled bank statement line to each of a set of historical bank statement line reconciliations for a specific user or participant, to identify a most similar line reconciliation to the unreconciled bank statement line, to extract one or more accounting book entry details from the said most similar reconciliation, and upon satisfaction of a threshold, to automatically or semi-automatically reconcile the unreconciled bank statement line with the extracted one or more accounting book entry details. A machine learning algorithm configures the similarity measurement model to solve the binary classification problem.

Bank Reconciliation is the process of linking a user's bank statement lines to their respective transaction documents for double entry bookkeeping, matching a user's accounting books to their financial bank accounts. In order to speed up the process of bank reconciliation and to reduce manual effort on the part of the user, the online bookkeeping tool may offer suggestions (i.e. semi-automated reconciliation) to either create or use existing transaction documents to be linked to user bank statement lines.

In reconciling bank statement lines, each unreconciled bank statement line is reconciled with an accounting book entry. The reconciliation may be for the entirety of the bank statement line (in terms of financial value) with the entirety of the accounting book entry. Alternatively, the reconciliation may be for a portion of the bank statement line with the entirety of the accounting book entry; so that there is a remainder of the bank statement line (in terms of financial value) which is pending reconciliation. Alternatively, the reconciliation may be for the entirety of the bank statement line with a portion of an accounting book entry, so that plural bank statement lines are combined to complete the reconciliation. The accounting book entry may be an existing accounting book entry. The accounting book entry may be suggested by the accounting system based on a defined logic rule. The accounting book entry may be a new accounting book entry created by the user as part of the reconciliation process. The accounting book entry may be a new accounting book entry created by the user as part of the reconciliation process and inheriting one or more details from an historical accounting book entry already mapped to a corresponding bank statement line. Some embodiments relate to the latter case. To reconcile an unreconciled bank statement line, an historical reconciliation is remembered (i.e. retrieved from storage) and in an automated or semi-automated manner, a new accounting book entry is created comprising one or more details from the accounting book entry in the historical reconciliation. Automated is when a new accounting book entry is created and reconciled with the unreconciled bank statement line in the absence of inputs to the accounting system by a user. Semi-automated is when the accounting system suggests the new accounting book entry to the user for approval before reconciliation.

The computing apparatus comprises processor hardware, memory hardware, and network interface hardware. The computing apparatus may be cloud computing infrastructure, or a client: server infrastructure. Services, such as an online bookkeeping service, are provided over a network such as the internet or a local network, and as such are considered to be online services. Services are provided to users, who may be personal users, business users, charity users, and users may be subscribers or other holders of accounts with the online bookkeeping service. It is noted that the term user may apply to a person, business, or other organization utilizing the online bookkeeping service, and may also apply to an individual representing those entities. For example, the individual may be an employee or a service provider such as an accountant. The term user is thus used in the sense of an entity utilizing the online bookkeeping service or a representative thereof.

It is assumed that each user of the online bookkeeping system holds one or more bank accounts for receiving and paying monies to customers and suppliers. The online bookkeeping service may manually or automatically import bank account statements for a user. Bank account statements comprise one or more bank statement lines. Bank account statements may be imported periodically according to a timetable to which they are issued to the bank account holder by the bank, or bank account statements may be imported on a rolling basis, such as daily or weekly, according to a timetable to which they are pulled from the bank system by the online bookkeeping system. Import may be via a bank feed, which is a data communication between the online bookkeeping system and the bank's own systems using credentials provided by the user for the automated obtaining of bank statement lines for the user's bank account(s). Import may comprise manual entry of bank statement lines into the online bookkeeping system by a user.

A bank statement line represents a payment into or from a bank account. In this disclosure, it is assumed that the bank account is exclusively used for payments relating to the user of the online bookkeeping service, and so all bank statement lines are to be reconciled. Of course, should a user use a bank account for multiple purposes, some of which are irrelevant from the perspective of the online bookkeeping service, then irrelevant bank statement lines may be deleted after import without reconciliation.

The reconciliation engine refers to the collective processing tasks relating to reconciling bank statement lines with accounting book entries. The reconciliation engine may implement plural processes for said reconciliation, which processes may be implemented according to a hierarchy or pipeline. Wherein those bank statement lines that can be reconciled by a first mechanism in the hierarchy or pipeline are, and those that cannot are passed to the next mechanism or process. For example, rules may be defined by a user to automate the reconciliation of bank statement lines that have certain properties or characteristics. Such rules may be a first mechanism or process. Some embodiments relate to an historical reconciliation tool, which may be a first mechanism in a hierarchy or pipeline, or may be further down and therefore be operable to reconcile (or to seek to reconcile) bank statement lines that are unreconciled following the preceding mechanism or mechanisms. Regardless, the historical reconciliation tool is a mechanism for reconciling unreconciled bank statement lines in an automated or semi-automated manner. Automated is when a new accounting book entry is created and reconciled with the unreconciled bank statement line in the absence of inputs to the accounting system by a user. Semi-automated is when the accounting system suggests the new accounting book entry to the user on a GUI (via which the user interacts with the online bookkeeping service) for approval before reconciliation. It is noted in this disclosure that the term unreconciled bank statement line is implicitly understood to mean a bank statement line pending processing by the historical reconciliation tool, to either reconcile the bank statement line or to pass the bank statement on to a next reconciliation mechanism, such as manual reconciliation.

An exemplary pipeline may comprise six stages: Batch; Match; Rule; Historical; Prediction; Manual. The order is exemplary and is configurable according to implementation requirements, likewise stages may be omitted or further stages included. Batch refers to batch payments of currency via a PoS payment provider such as Stripe (registered trademark); Match refers to suggestions of existing transaction documents (for example, user has already created the transaction document which is itself unreconciled); Rule refers to the creation of new transaction documents based on rules defined by customers (for example using a rule creation interface in the GUI); Historical is using the historical reconciliation tool such as illustrated in FIG. 1 and is automated or semi-automated creation of new transaction documents based on historical reconciliations; Prediction extracts detail from the unreconciled bank statement line, feeds the detail into a model, and the model outputs a suggestion of one or more details for inclusion in a new transaction document that may or may not have historical precedent; and Manual is entry of transaction documents by a user, for example into a form section of the GUI. Transaction documents is a term used to refer to an account ledger entry composed of multiple transaction details or elements. The account ledger entry is categorized in accordance with an ontology according to which data are logically arranged in the accounting system.

There may be mechanisms below or proceeding the historical reconciliation tool in the hierarchy or pipeline, for example, manual reconciliation via a manual recognition interface component of the online bookkeeping service GUI.

The historical reconciliation tool is a process or mechanism provided as part of the online bookkeeping service, and contains multiple steps at runtime, and further design time or maintenance steps. Runtime steps are illustrated in FIG. 1 and include S101 information retrieval to read a set of historical reconciled bank statement lines from a storage area storing a record of historical reconciliations for the same user. The information retrieval step S101 may be executed per unreconciled bank statement line or for a batch of unreconciled bank statement lines imported together. For a particular user, the process is for a single bank account. That is, the unreconciled bank statement lines are imported together from a single bank account belonging to the user and registered with the online bookkeeping service. The process may be repeated for another bank account belonging to the user and registered with the online bookkeeping service. There may be a maximum number of lines (i.e., not to exceed or be greater than) that are imported together, for example, ten, twenty, thirty, forty, or fifty. Should there be further unreconciled bank statement lines in the bank statement, the process would be repeated until all unreconciled lines have been processed by the runtime steps of FIG. 1.

The information retrieval step S101 may also be referred to as a dataset creation step or a candidate retrieval step. Regardless, a set of historical bank statement line reconciliations is retrieved from a stored record of historical bank statement line reconciliations for processing at S102. Each unreconciled bank statement line may be referred to as a target, and each historical bank statement line reconciliation may be referred to as a candidate. Therefore, the set of historical bank statement line reconciliations comprises candidates (i.e. the reconciled bank statement lines themselves), each of which includes a reconciled bank statement line, and one or more details of the account ledger entry with which it was reconciled. The record of historical bank statement line reconciliations comprises not only the bank statement lines that were reconciled, but the respective accounting ledger entries (or a subset of details/elements thereof) to which they were reconciled. The dataset may be created for a single unreconciled bank statement line or for a batch or other grouping or set of unreconciled bank statement lines for the user.

Runtime steps also include a similarity processing step S102, using a similarity measurement model to quantify similarity of the unreconciled bank statement line to each of a set of historical bank statement line reconciliations for the same user, to identify a most similar historical bank statement line reconciliation to the unreconciled bank statement line, to extract one or more accounting book entry details from the said most similar historical bank statement line reconciliation. The similarity measurement model assesses text similarity between two text strings. The first text string is the target, which is the unreconciled bank statement line. The text string may be, for example, a concatenation of one or more fields from the bank statement line. The second text string is an historical bank statement line reconciliation, which is a bank statement line and one or more accounting book details with which the bank statement line was reconciled. The similarity model is adapted to accommodate heterogeneous inputs, that is, a first text string that is only a bank statement line and a second text string that is a bank statement line with one or more accounting book details. More detail on the similarity model and its components is provided below. The similarity model may utilize one or more different component similarity measures, each being an input vector component (so that the input vector is a representation of similarity between the unreconciled bank statement line and the historical bank statement line reconciliation), which are combined as a weighted average or weighted aggregated with configurable weights, and a bias being a fixed quantity added or subtracted from the weighted average or weighted aggregate.

Runtime steps also include a threshold comparison step S103, in which the quantification of similarity between the unreconciled bank statement line and said most similar reconciled bank statement is compared with a predefined threshold. The predefined threshold is predefined in the context of processing the unreconciled bank statement line, having been defined either as a preset value at design time or during maintenance processing, for example by a machine learning algorithm. The threshold effectively determines when to make an automated or semi-automated reconciliation at step S104 (i.e. when the threshold is satisfied), and when to move to the next stage in the hierarchy/pipeline S105 (i.e. when the threshold is not satisfied).

Therefore, the threshold may be configured to reduce "false positives" i.e. automated or semi-automated reconciliations that turn out to be incorrect, and to reduce "false negatives", i.e. a determination not to make an automated or semi-automated reconciliation which would, in fact, have been correct. Specifically this is a trade-off that is calibrated to meet quality thresholds for the historical reconciliation tool (e.g to maintain a certain level of accuracy with suggestions offered via the GUI). Reducing the number of false positives is at the cost of introducing false negatives and vice versa. The threshold may be configurable via a user-selectable parameter, for example, which offers three, four, or five levels of tendency to offer reconciliation suggestion via the GUI (such as always, often, rarely, very rarely).

FIG. 1 also includes design time or maintenance steps configuring the similarity measurement model S106 and configuring the threshold S107. Configuring the threshold S107 is illustrated in dashed lines to indicate that it is an optional feature that may be included in some implementations and be absent from others. The similarity measurement model may be multi-factorial metric composed of weighted contributions from multiple input vector components. A vector in this context means an aggregation of one or more scores or values of individual components. The input denotes that there is a further step in the model once the individual input vector components are obtained, which is the weighted combination of the individual input vector components and optionally also application of a bias (i.e. addition or subtraction of a fixed value). An input vector component is a score of a single similarity metric or score assessing similarity between the target and the candidate. The weights themselves are configurable elements, configurable by a machine learning algorithm at step S106. Configuration, which may also be referred to as reconfiguration, is performed periodically or after a set number of unreconciled bank statement lines have been processed. For example, daily, weekly, monthly, or after 1000, 10000, or 100000 unreconciled bank statement lines have been processed. The threshold may also be configured at S107, discussed in more detail below with reference to the confusion table. The similarity measurement model may be configured per user or on a global basis. For example, it may be dependent upon a number of historical reconciliations recorded for the user, so that once a minimum number is achieved, there is enough data to facilitate a user-specific configuration of the similarity measurement model. Conversely, when there is not sufficient recorded historical reconciliations for the user, the globally-configured similarity measurement model is employed. There may be a generic set of starting values for initial deployment whilst a history of reconciliations is generated to inform a first execution of configuration step S106.

Training the Simulation Model

Figure 2:
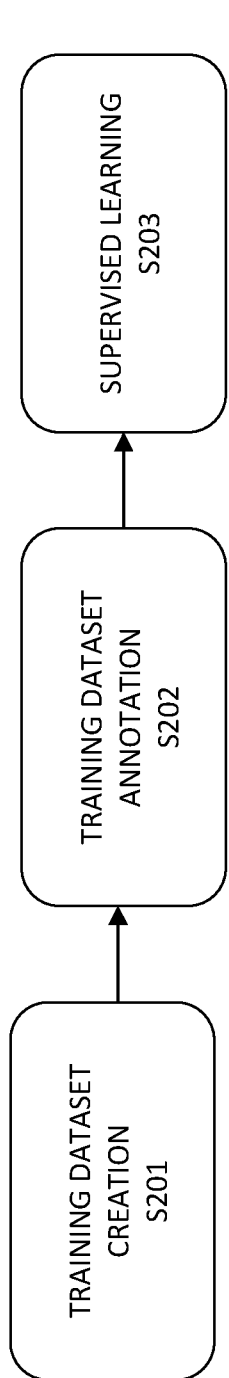
FIG. 2 illustrates training/maintenance processing according to an embodiment.

The configuring step S106 is a machine learning process itself comprising multiple steps. The configuring step S106 may also be referred to as the training step or training process. The training process is illustrated in FIG. 2. A first step in the training process is a training dataset creation step, and comprises:

For a given bank account of a user, identify training targets (i.e. bank statement lines for which reconciliation details were sought) by extracting from the record of historical reconciliations all the bank statement lines (and respective transaction documents) that were reconciled within a specific time period (i.e. the past X days/weeks/months);

had no suggestions from earlier/higher stages in the pipeline/hierarchy (and either had suggestions from the historical reconciliation tool or had no suggestions from the historical reconciliation tool), because these are the statement lines for which the historical reconciliation tool is being trained; and are only associated with spend and receive monies (ie, INVOICETYPE/CASHPAID", "INVOICETYPE/CASHREC", "INVOICETYPE/EXTERNALSPEND-MONEY") because these are the only cases for which the historical reconciliation tool would make reconciliation suggestions.

The training set may comprise targets that were reconciled by creating a new ledger entry at the point of reconciliation by any of: —a suggestion from the historical reconciliation tool; —a prediction suggestion; —manual entry by user.

For each training target, identify a list of training candidate statement lines that come from the same bank account and were reconciled within a time window in days (days_of_history) relative to the target. In effect, this step is simulating the set of historical reconciled bank statement lines that would have been retrieved at runtime processing of the historical reconciliation tool in processing the training target.

In this training process, the dataset comprises the following elements (fields) in the bank statement line and respective transaction documents (accounting book/ledger entry):

UID: Unique identifier

Timestamp: Date and time of reconciliation

Payee: Name of payee (from the bank statement line)

Reference: Reference text (from the bank statement line)

Notes: Additional text (from the bank statement line)

Amount: Amount of the statement line

LineItemCount: Number of items in the transaction

InvoiceTypeCode: Type of invoice/transaction.

Text: Concatenation with white space of normalised and lowercase fields: "Payee", "Reference", and "Notes" from the bank statement line.

PaidToContactId: Unique identifier of contact paid to

PaidToName: Name of contact paid to on invoice/transaction/ledger entry

FirstLineItemAccountId: Unique identifier of account code ledger entry is associated with Following training dataset creation at S201, the training dataset is annotated at S202. Each target in the training dataset has a list of candidates, and both targets and candidates represent reconciled statement lines, therefore the annotation is based on the reconciliations. For example, a pair of target and candidate are a correct match when their respective PaidToContactId elements are equal to one another, and their respective FirstLineItemAccountId fields are equal to one another. Otherwise, if either field differs, the pair are not considered to be a correct match. In other words, for each training target bank statement line, each of the respective candidate bank statement lines is either a correct match (they were reconciled with common elements) or an incorrect match (they were not reconciled with common elements). Wherein common elements refers to matching values instantiating the same element.

In a sample training dataset, the statistics on a small dataset made up from two days of targets, each with one day of history are the following:

31% of pairs are a correct match,

62% of pairs are an incorrect match, and

7% of targets do not have any candidates.

From the 62% of incorrect matches,

42% had both contact and account incorrect,

16% had the account correct and contact incorrect, and 4% had the contact correct and the account incorrect.

The historical reconciliation tool is based on text similarity (and other features) and its function can be represented as a binary classification problem formulated as follows:

Given a target statement line and a set of candidate historical bank statement line reconciliations, what candidate is the most similar to the target such that we can reconcile the target with the candidate's reconciliation details?

The problem is one of binary classification because targets have correct and incorrect candidates in dependence upon their respective reconciliation details. For example, a target and a candidate are a correct match when both have been reconciled to the same contact and account code, otherwise they are an incorrect match (when either or both contact and account code differ).

The confusion matrix in a binary classification problem describes the performance of a classifier given all the possible combinations of actions and outcomes. Specifically, in the context of the historical reconciliation tool, a classifier has two possible actions: either to suggest or to abstain; and the outcomes are whether the action was correct or not. Thus, the confusion matrix below represents outcomes of the classifier (wherein in this example the end result is a semi-automated reconciliation or "suggestion" rather than an automated reconciliation):

| | | Actions | |
|---|---|---|---|
| | | Suggest | Abstain |
| Outcomes | Correct | TP: True Positive | TN: True Negative |
| | Incorrect | FP: False Positive | FN: False Negative | where True Positive refers to the classifier suggesting a correct candidate, False Positive refers to suggesting an incorrect candidate, True Negative refers to abstaining from suggesting an incorrect candidate, and False Negative refers to abstaining from suggesting a correct candidate. In the case of a target without candidates, we refer to this instance as NC: No candidates. The decision of whether to suggest or abstain is configurable via a bias or via a threshold similarity required between a target and a respective most similar candidate Based on the above confusion matrix, the following metrics describe the operation of the classifier:

Recall refers to the percentage of correct memorisations that the classifier suggests.

$$recall = TP/(TP + FN)$$

Precision refers to the percentage of memorisations that the classifier correctly suggests $$precision = TP/(TP + FP)$$

Accuracy refers to the overall performance of the classifier in terms of the correct candidates suggested and incorrect candidates abstained $$\mathrm{accuracy} = (TP + TN)/(TP + TN + FP + FN)$$

Coverage refers to the percentage of observations for which the classifier is offering suggestions $$\mathrm{coverage} = (TP + FP)/(TP + TN + FP + FN + NC)$$

Following the annotation step S202, a supervised learning step S203 is performed to configure a function (similarity measurement model) that maps an input vector of features to a desired output vector.

In the formulated binary classification problem, the input vector is a set of numerical features or components (eg, each representing a score in a measure of text similarity between target and a candidate) and the desired output is whether they both have been reconciled to the same contact and account or not. In this training process, it is possible to compare the reconciliation details because the training dataset created at S201 is made up from reconciled targets, but the function of the training process is to train the historical reconciliation tool (ie, by configuring the similarity measurement model) with reconciled data and put it into the runtime processing at S102 to determine suggestions to unreconciled targets.

The supervised learning step S203 may utilise a logistic regression technique. Feature engineering refers to the process of extracting numerical characteristics (known as features, or input vector components) from the targets and candidates that would help an algorithm (ie, Logistic Regression in our case) to compute a probability for the pair to be a correct match. Logistic Regression is a supervised learning algorithm for binary classification. The algorithm learns the importance of the input vector components from the training set as numerical coefficients (or weights), and estimates the probability of the output to be True based on the following equation:

$$p = \left(1 + e^{-\left(\beta_0 + \Sigma_{i=1..n} \beta_i x_i\right)}\right)^{-1}$$

where p is the probability of the output being True, $\beta_0$ is the bias (or intercept) term, $\beta_i$ is the coefficient (weight) of feature i, $x_i$ is the value of feature i, and n is the number of features.

In the present domain, the logistic regression estimates the probability of correct match between a given target and each of its candidates one at a time. The logistic regression estimates the probability that a target and a single candidate at a time are a correct match (wherein a correct match is determined by having the same contact and account codes). The candidate with the highest probability of being the correct match is selected after the target has been compared with each member of the set of candidates. Depending on the probability and a predefined threshold, the model decides whether to suggest or abstain the transaction details of the most likely candidate (at S103). This is how the confusion matrix is computed, by only considering the most likely candidate.

The logistic regression configures the weights applied to individual input vector components. Embodiments may utilise different combinations of input vector components to represent similarity between a target bank statement line and candidate historical bank statement line reconciliations.

The combinations of input vector components (features) presented below have been derived by following an iterative approach to create features and models based on Logistic Regression, starting from a basic model, exploring the performance thereof in terms of False Positives and False Negatives to create features to address common patterns, and then to derive a feature or combination of features and repeat the process.

By way of example, three combinations of input vector components are disclosed.

In the first example, a single input vector component measures similarity.

(1.1) Text Similarity: quantifies the similarity between the text of a target and a candidate by means of the normalized Levenshtein distance. Feature value is in [0.0, 1.0], where values correlate with similarity. The 1 in the denominator is added to ensure there is no division by 0 in the case of two empty text fields.

$$F_1 = 1.0 - \frac{\mathrm{Levenshtein(target.Text), candidate.Text)}}{1 + \max(len(\mathrm{target.Text}), len(\mathrm{candidate.Text}))}$$

In the second example, two input vector components measure similarity:

(2.1) Words Similarity: After extracting or excluding all the words containing non-numeric characters from the target and candidate, the feature computes the normalized Levenshtein distance. Feature value is in [0.0, 1.0], where values correlate with similarity.

$$F_1 = 1.0 - \frac{\mathrm{Levenshtein(words(target.Text), words(candidate.Text))}}{1 + \max(len(\mathrm{words(target.Text)}), len(\mathrm{words(candidate.Text)}))}$$

(2.2) Numbers Similarity: After extracting all the words containing only numeric characters from the target and candidate, the feature computes the normalised Levenshtein distance.

$$F_2 = 1.0 - \frac{\mathrm{Levenshtein(numeric(target.Text), numeric(candidate.Text))}}{1 + \max(len(\mathrm{numeric(target.Text)}), len(\mathrm{numeric(candidate.Text)}))}$$

In the third example, seven input vector components measure similarity:

(3.1) Words Similarity: As in the second example, with the optional removal of calendar month names and their three-letter abbreviations in English. The benefit of removing the month names and abbreviations is that it increases precision by about 1%, but at the cost of enforcing the English language onto the model and increasing the computational complexity of the feature.

(3.2) Numbers Similarity: As in the second example.

(3.3) Proportion of Candidate Payee Words in Target Text: The proportion of candidate's payee words that appear or partially appear in the target text relative to the payee words. Feature value is in [0.0, 1.0], where 1.0 means all the words are in the target text and 0.0 means none (i.e., nil) of the words are there.

$$F_3 = \frac{\sum_{word}^{payee} len(\text{word}) \text{ if word} \in \text{target.Text otherwise } 0}{len(\text{payee.Text})}$$

(3.4) Amounts are equal: Whether the amount of the target statement line is equal to the amount of the candidate statement line. Feature is 1 when the amounts are the same, and 0 when the amounts are different.

$$F_4 = 1 \text{ if target.amount} = \text{candidate.amount otherwise } 0$$

(3.5) Words with Numbers match: Whether the words containing numbers in the target are equal to the words containing numbers in the candidate. Feature is 1 when there are words with numbers and they are the same, and 0 otherwise.

$$F_5 = 1 \text{ if } alphanum(\text{target.Text}) = alphanum(\text{candidate.Text}) \text{ otherwise } 0$$

(3.6) More payee words in candidate text than in target text: Whether the candidate text contains more payee words than the target text. Feature is 1 if the candidate text contains strictly more words of the payee than the target text, and 0 otherwise.

$$F_{candidate} = \sum_{word}^{payee} 1 \text{ if word} \in \text{candidate.Text otherwise } 0$$

$$F_{target} = \sum_{word}^{payee} 1 \text{ if word} \in \text{target.Text otherwise } 0$$

$$F_6 = 1 \text{ if } F_{candidate} > F_{target} \text{ otherwise } 0$$

(3.7) Candidate has one line item: Whether the candidate statement line has a single line item. Feature is 1 when there is one line item, and 0 when there are multiple line items. The underlying expectation is that where the candidate bank statement line is more similar (contains more payee words) to the candidate transaction ledger entry than the target bank statement line is to the candidate transaction ledger entry there is less likelihood of common reconciliation and so the target/candidate are deemed less similar. In line with said underlying expectation, when the present feature (input vector component) is included, overall accuracy of the similarity model is increased and it has a high negative weight, so a value of 1 for the present feature greatly reduces confidence (i.e. similarity quantification) assigned by the model to the target-candidate pair.

$$F_7 = 1 \text{ if } len(\text{candidate.lineItems}) = 1 \text{ otherwise } 0$$

Experimental Data

A sample similarity model is trained using a sample training dataset. The dataset was made up from four days of targets, each with two days of history, obtained from a sample of eligible users of a real world accounting system with live data. More history increases the coverage of the resultant model. Embodiments may be implemented with training datasets comprising a week, a month, a year, or more of historical data.

In this experiment, a testing dataset is used in addition to the training dataset. The testing dataset simulates live deployment of the trained model (i.e. the historical reconciliation tool) in the online bookkeeping service. The training and testing set were split 50% and 50% based on target statement lines, that is, the target and all of its respective candidates will end up in either the training or testing set. The training set and the testing set contain 4.09M and 4.06M pairs of targets and candidate statement lines. A total of 6.3% of targets do not have candidate statement lines.

The model is evaluated at the threshold necessary to achieve 80% of recall.

The metrics of recall, precision, accuracy, and coverage, are reported by statement line and by user. Coverage and precision are conflicting metrics, that is, increasing one decreases the other and vice versa, and the training process may be configured to aim for a particular level of coverage or precision, depending on implementation requirements and/or preference.

A similarity model in the present experiment has seven input vector components in accordance with the third similarity model disclosed above in 3.1 to 3.7. For example, input vector components (3.5) and (3.6) have negative weights in the trained model, and the remaining input vector components have positive weights. The bias in the trained model in the experiment is negative. The trained model is able to offer suggestions to 34.0% of statement lines, from which 78.1% are correct; but the metrics reduce to coverage of 19.3% of users at 77.9% precision. The difference between the metrics by statement line and by user indicates that there are users that have more statement lines than others.

| Metrics by Statement Line | Average Metrics by User |
|---|---|
| Recall: 0.800070 | Recall: 0.750107 |
| Precision: 0.781388 | Precision: 0.779661 |
| Accuracy: 0.848417 | Accuracy: 0.882296 |
| Coverage: 0.342819 | Coverage: 0.193706 |

Figure 3:
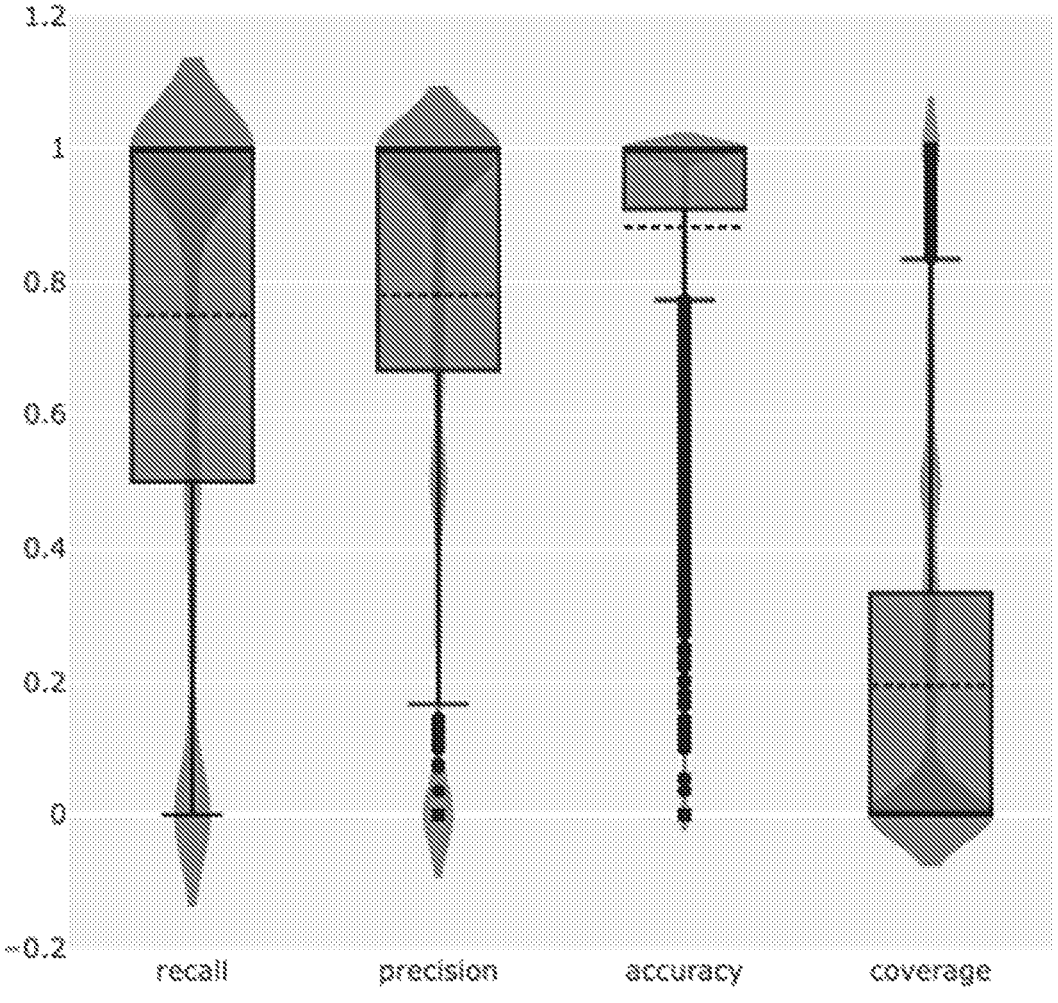
FIG. 3 illustrates performance of an experimental implementation of an historical reconciliation tool in accordance with an embodiment.

FIG. 3 illustrates performance metrics by user of the present experimental similarity model and historical reconciliation tool, where the dashed line represents the mean across users. The precision mean is 77.9%, but the median is 100%; and the coverage mean is 19.3%, but the median is 0%. In other words, the coverage indicates that 50% of users get no suggestions, while the other 50% get some suggestions; and the precision indicates that 50% of users with coverage get perfect suggestions (precision of 100%), and 75% of users have a precision of at least 65%. This model outperforms existing mechanisms for suggesting reconciliation details based on historical data.

Figure 4:
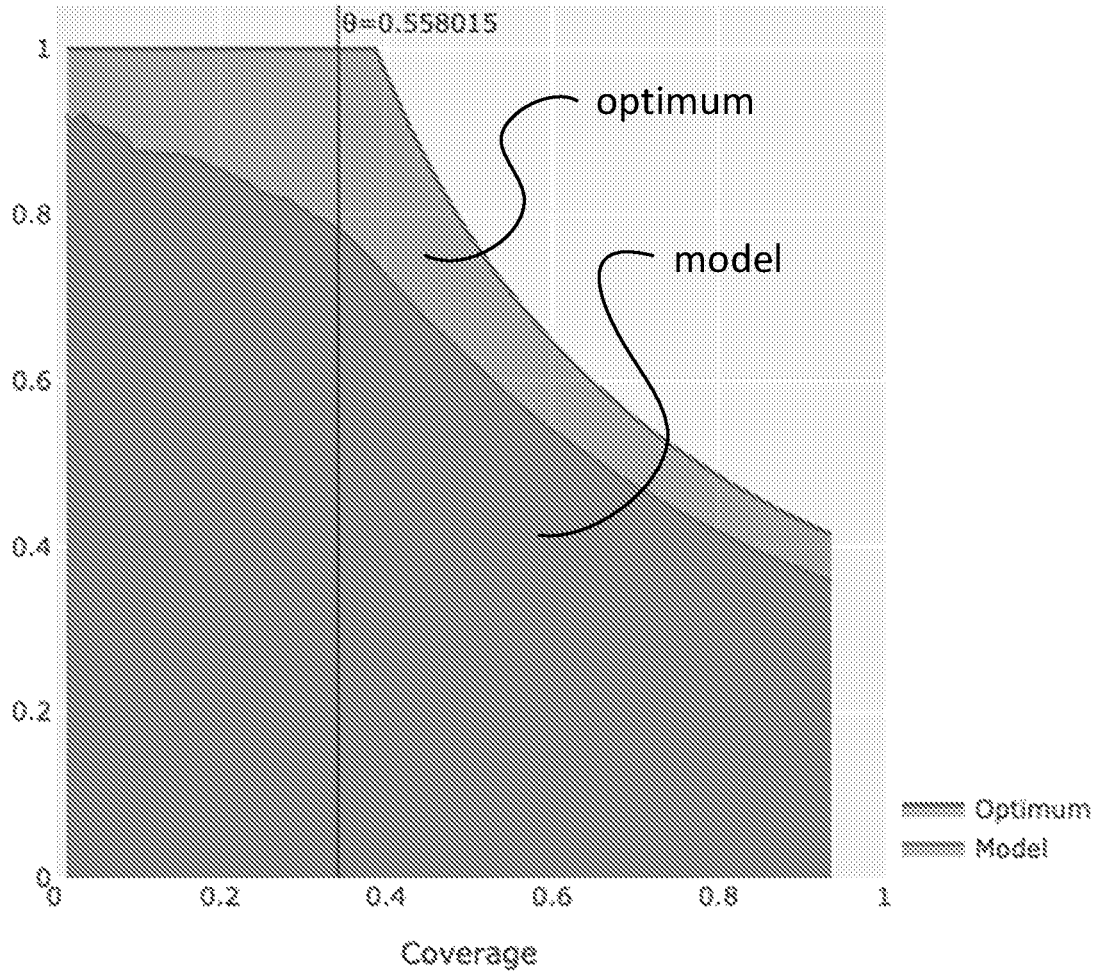
FIG. 4 illustrates performance of an experimental implementation of an historical reconciliation tool in accordance with an embodiment.

FIG. 4 illustrates coverage over precision of statement lines with the similarity model of the experiment and the theoretical optimum possible. The threshold 0.558015 gives about 80% recall at 78.1% precision, which leads to a 34.2% coverage. This model could deliver 85% precision at a ~20% coverage.

Figure 5:
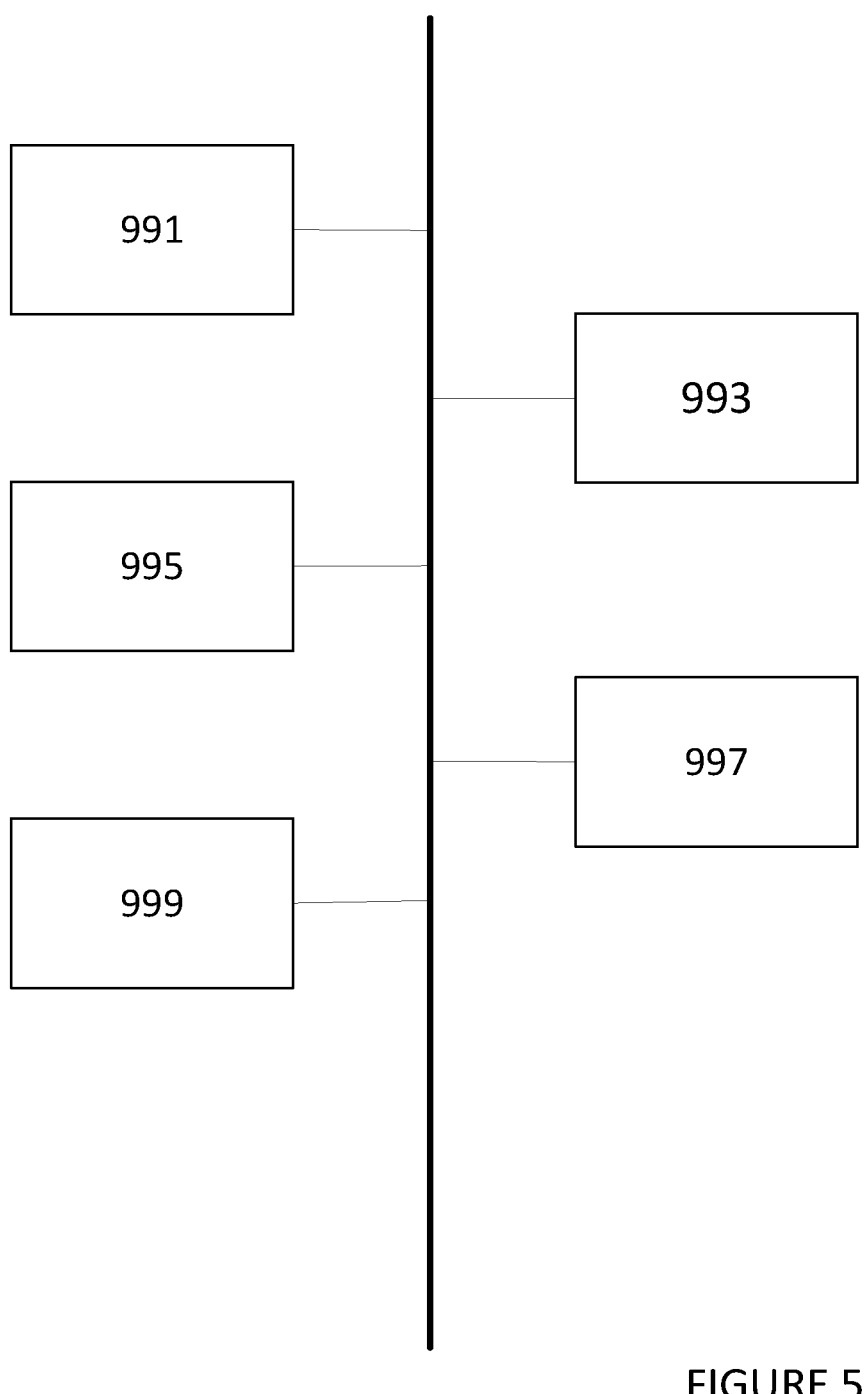
FIG. 5 illustrates a computing apparatus of an embodiment.

FIG. 5 is a schematic illustration of a hardware arrangement of a computing apparatus implementing an online bookkeeping tool as disclosed above. A user device and/or a server such as the web server may be implemented by apparatus having an arrangement such as illustrated in FIG. 5.

The computing apparatus comprises a plurality of components interconnected by a bus connection. The bus connection is an exemplary form of data and/or power connection. Direct connections between components for transfer of power and/or data may be provided in addition or as alternative to the bus connection.

The computing apparatus comprises memory hardware 991 and processing hardware 993, which components are essential regardless of implementation. Further components are context-dependent, including a network interface 995, input devices 997, and a display unit 999. The display unit 999 and the processing hardware 993 may cooperate to implement a graphical user interface.

The memory hardware 991 stores processing instructions for execution by the processing hardware 993. The memory hardware 991 may include volatile and/or non-volatile memory. The memory hardware 991 may store data pending processing by the processing hardware 993 and may store data resulting from processing by the processing hardware 993.

The processing hardware 993 comprises one or a plurality of interconnected and cooperative CPUs for processing data according to processing instructions stored by the memory hardware 991.

Implementations may comprise one computing device according to the hardware arrangement of FIG. 5, or a plurality of such devices operating in cooperation with one another. For example, in a client: server arrangement.

A network interface 995 provides an interface for transmitting and receiving data over a network. Connectivity to one or more networks is provided. For example, a local area network and/or the internet. Connectivity may be wired and/or wireless.

Input devices 997 provide a mechanism to receive inputs from a user. For example, such devices may include one or more from among a mouse, a touchpad, a keyboard, an eye-gaze system, and a touch interface of a touchscreen. Inputs may be received over a network connection. For example, in the case of server computers, a user may connect to the server over a connection to another computing apparatus and provide inputs to the server using the input devices of the another computing apparatus.

A display unit 999 provides a mechanism to display data visually to a user. The display unit 999 may display user interfaces by which certain locations of the display unit become functional as buttons or other means allowing for interaction with data via an input mechanism such as a mouse. A server may connect to a display unit 999 over a network.

A mechanism for reconciling unreconciled bank statement lines with corresponding accounting book entries in an online bookkeeping service. A machine-configurable similarity measurement model is applied to quantify similarity of an unreconciled bank statement line to each of a set of historical bank statement line reconciliations for a specific user, to identify a most similar line reconciliation, and upon satisfaction of a threshold, to automatically reconcile the unreconciled bank statement line with extracted accounting book entry details from the identified reconciliation.

The invention claimed is:

1. A computing apparatus comprising processor hardware, memory hardware, and network interface hardware, the memory hardware storing processing instructions which, when executed by the processor hardware, cause the computing apparatus to provide a reconciliation engine for reconciling unreconciled bank statement lines with corresponding accounting book entries in an online bookkeeping service of an accounting system having one or more users, the unreconciled bank statement lines being imported into the accounting system and representing a payment in which the user is a participant;

the reconciliation engine comprising an historical reconciliation tool, being operable, for each of one or more of the unreconciled bank statement lines, to use a similarity measurement model to quantify similarity of the unreconciled bank statement line to each of a set of historical bank statement line reconciliations for a same user, to identify a most similar historical bank statement line reconciliation to the unreconciled bank statement line, to extract one or more accounting book entry details from the said most similar historical bank statement line reconciliation, and upon satisfaction of a threshold minimum similarity, to automatically or semi-automatically reconcile the unreconciled bank statement line with the extracted one or more accounting book entry details;

the computing apparatus being operable to execute a machine learning algorithm to configure the similarity measurement model, the similarity measurement model comprising one or more input vector components, with respective configurable weights, and a configurable bias;

wherein the machine learning algorithm is a logistic regression machine learning algorithm operable to configure the weights of each of the one or more input vector components; and wherein the one or more input vector components comprises two input vector components:

a first input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of same bank statement line elements in a same order and from which words containing numeric characters are excluded, a second input vector component being normalized Levenshtein distance between a second unreconciled text string, representing the unreconciled bank statement line, and a second reconciled text string representing the historical bank statement line reconciliation, the second unreconciled text string and the second reconciled text string each being composed of a concatenation of text strings being values of the same bank statement line elements in the same order and from which words not containing numeric characters are excluded.

2. The computing apparatus according to claim 1, wherein the reconciliation is semi-automatic and comprises suggesting to a user, via a graphical user interface of the reconciliation tool, the extracted one or more accounting book entry details as accounting book entry details for the unreconciled bank statement line, and reconciling the unreconciled bank statement lines with the extracted one or more accounting book entry details in dependence upon a positive indication from the user.

3. The computing apparatus according to claim 1, wherein configuring the similarity measurement model is executed with a training set comprising a plurality of pairs of historical bank statement line reconciliations for the user, and for each pair an input vector is composed of a value of each of the one or more input vector components for the pair, and a desired output vector is a binary indicator representing whether or not a threshold commonality between the accounting book entry details of the respective reconciliations is satisfied.

4. The computing apparatus according to claim 1, wherein the set of historical bank statement line reconciliations comprises reconciliations of bank statement lines dated within a threshold maximum number of days preceding a present date.

5. The computing apparatus according to claim 1, wherein the one or more input vector components includes input vector components based on similarity of one or a combination of values of payee text, reference text, and notes text, of relevant bank statement lines and corresponding reconciled accounting book entry details.

6. The computing apparatus according to claim 1, wherein the unreconciled bank statement line and the historical bank statement line reconciliations comprise values of a combination of bank statement line elements from among:

from the bank statement line:
unique identifier;
timestamp of the represented payment;
payee of the represented payment;
reference text of the represented payment;
notes relating to the represented payment;
amount of currency transferred by the represented payment.

7. The computing apparatus according to claim 6, wherein the historical bank statement line reconciliations include values of accounting book entry detail elements from among:

number of items in the represented payment;
a timestamp for a timing of reconciliation;
a code indicating a type of the represented payment;
a text concatenation of the payee, reference text, and notes, of the represented payment;
a contact identifier for a representation of the payee within the accounting system;
a unique identifier of an account into which the represented payment is received.

8. The computing apparatus according to claim 1, wherein the machine learning algorithm configures the similarity measurement model to solve a binary classification problem formulated as:

given the unreconciled bank statement line and the set of historical bank statement line reconciliations for the same user, which of the set of historical bank statement line reconciliations is most similar to the unreconciled bank statement line such that the accounting book entry details of the said most similar historical bank statement line reconciliation can be inherited automatically or semi-automatically by the unreconciled bank statement line.

9. The computing apparatus according to claim 8, wherein the machine learning algorithm configures the historical reconciliation tool to adapt the threshold minimum similarity to reduce a number of incorrect suggestions exceeding the threshold minimum similarity and to reduce a number of correct suggestions not exceeding the threshold minimum similarity.

10. The computing apparatus according to claim 1, wherein the one or more input vector components comprises a single input vector component, the single input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of the same bank statement line elements in the same order.

11. The computing apparatus according to claim 1, wherein the one or more input vector components comprises two, three, four, five, six, or seven input vector components from among:

a first input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of the same bank statement line elements in the same order and from which words containing numeric characters are excluded, and optionally from which calendar month names and abbreviations thereof are excluded, a second input vector component being normalized Levenshtein distance between a second unreconciled text string, representing the unreconciled bank statement line, and a second reconciled text string representing the historical bank statement line reconciliation, the second unreconciled text string and the second reconciled text string each being composed of a concatenation of text strings being values of the same bank statement line elements in the same order and from which words not containing numeric characters are excluded, a third input vector component being a proportion of words from a payee name text string instantiating a payee name element in the accounting book entry details of the historical bank statement line reconciliation that appear in the first unreconciled text string representing the unreconciled bank statement line, as a proportion of a the number of words in the payee name text string;

a fourth input vector component being a binary value representing whether or not line elements representing respective financial values of the unreconciled bank statement line and the historical bank statement line reconciliation match one another or not;

a fifth input vector component being a binary value representing whether a fifth unreconciled text string, representing the unreconciled bank statement line, and a fifth text string, representing the historical bank statement line reconciliation, are equal to one another, wherein the fifth reconciled text string and the fifth unreconciled text string are each composed of a concatenation of all words containing numbers from the unreconciled bank statement line and from the bank statement line of the historical bank statement line reconciliation, wherein the binary value is nil in case of there being no words containing numbers or no match;

a sixth input vector component being a binary value representing whether or not a number of words from a text string instantiating a payee name element in the unreconciled bank statement line that appear in the historical bank statement line reconciliation is greater than a number of words from the said text string that appear in the unreconciled bank statement line;

a seventh input vector component being a binary value representing whether or not the historical bank statement line reconciliation has a single line item or not.

12. A computer-implemented method comprising providing a reconciliation engine for reconciling unreconciled bank statement lines with corresponding accounting book entries in an online bookkeeping service of an accounting system having one or more users, the unreconciled bank statement lines being imported into the accounting system and representing a payment in which the user is a participant;

the method including an historical reconciliation process, for each of one or more of the unreconciled bank statement lines, comprising:

using a similarity measurement model to quantify similarity of the unreconciled bank statement line to each of a set of historical bank statement line reconciliations for a same user, to identify a most similar historical bank statement line reconciliation to the unreconciled bank statement line, to extract one or more accounting book entry details from the said most similar historical bank statement line reconciliation, and upon satisfaction of a threshold minimum similarity, to automatically or semi-automatically reconcile the unreconciled bank statement line with the extracted one or more accounting book entry details;

the method further comprising executing a machine learning algorithm to configure the similarity measurement model, the similarity measurement model comprising one or more input vector components, with respective configurable weights, and a configurable bias;

wherein the machine learning algorithm is a logistic regression machine learning algorithm operable to configure the weights of each of the one or more input vector components; and wherein the one or more input vector components comprises two input vector components:

a first input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of same bank statement line elements in a same order and from which words containing numeric characters are excluded, a second input vector component being normalized Levenshtein distance between a second unreconciled text string, representing the unreconciled bank statement line, and a second reconciled text string representing the historical bank statement line reconciliation, the second unreconciled text string and the second reconciled text string each being composed of a concatenation of text strings being values of the same bank statement line elements in the same order and from which words not containing numeric characters are excluded.

13. A computer program which, when executed by a computing apparatus having processor hardware and memory hardware, causes the computing apparatus to perform a method comprising providing a reconciliation engine for reconciling unreconciled bank statement lines with corresponding accounting book entries in an online bookkeeping service of an accounting system having one or more users, the unreconciled bank statement lines being imported into the accounting system and representing a payment in which the user is a participant;

the method including an historical reconciliation process, for each of one or more of the unreconciled bank statement lines, comprising:

using a similarity measurement model to quantify similarity of the unreconciled bank statement line to each of a set of historical bank statement line reconciliations for a same user, to identify a most similar historical bank statement line reconciliation to the unreconciled bank statement line, to extract one or more accounting book entry details from the said most similar historical bank statement line reconciliation, and upon satisfaction of a threshold minimum similarity, to automatically or semi-automatically reconcile the unreconciled bank statement line with the extracted one or more accounting book entry details;

the method further comprising executing a machine learning algorithm to configure the similarity measurement model, the similarity measurement model comprising one or more input vector components, with respective configurable weights, and a configurable bias;

wherein the machine learning algorithm is a logistic regression machine learning algorithm operable to configure the weights of each of the one or more input vector components; and wherein the one or more input vector components comprises two input vector components:

a first input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of same bank statement line elements in a same order and from which words containing numeric characters are excluded, a second input vector component being normalized Levenshtein distance between a second unreconciled text string, representing the unreconciled bank statement line, and a second reconciled text string representing the historical bank statement line reconciliation, the second unreconciled text string and the second reconciled text string each being composed of a concatenation of text strings being values of the same bank statement line elements in the same order and from which words not containing numeric characters are excluded.

14. A computer program which, when executed by a computing apparatus comprising processor hardware and memory hardware, causes the computing apparatus to;

provide a reconciliation engine for reconciling unreconciled bank statement lines with corresponding accounting book entries in an online bookkeeping service of an accounting system having one or more users, the unreconciled bank statement lines being imported into the accounting system and representing a payment in which the user is a participant; and perform an historical reconciliation process, for each of one or more of the unreconciled bank statement lines, comprising:

using a similarity measurement model to quantify similarity of the unreconciled bank statement line to each of a set of historical bank statement line reconciliations for a same user, to identify a most similar historical bank statement line reconciliation to the unreconciled bank statement line, to extract one or more accounting book entry details from the said most similar historical bank statement line reconciliation, and upon satisfaction of a threshold minimum similarity, to automatically or semi-automatically reconcile the unreconciled bank statement line with the extracted one or more accounting book entry details; and executing a machine learning algorithm to configure the similarity measurement model, the similarity measurement model comprising one or more input vector components, with respective configurable weights, and a configurable bias;

wherein the machine learning algorithm is a logistic regression machine learning algorithm operable to configure the weights of each of the one or more input vector components; and wherein the one or more input vector components comprises two input vector components:

a first input vector component being normalized Levenshtein distance between a first unreconciled text string, representing the unreconciled bank statement line, and a first reconciled text string representing the historical bank statement line reconciliation, the first unreconciled text string and the first reconciled text string each being composed of a concatenation of text strings being values of same bank statement line elements in a same order and from which words containing numeric characters are excluded, a second input vector component being normalized Levenshtein distance between a second unreconciled text string, representing the unreconciled bank statement line, and a second reconciled text string representing the historical bank statement line reconciliation, the second unreconciled text string and the second reconciled text string each being composed of a concatenation of text strings being values of the same bank statement line elements in the same order and from which words not containing numeric characters are excluded.

15. A non-transitory computer-readable medium storing the computer program of claim 14.

* * * * *